(12) United States Patent
Kim

(10) Patent No.: US 9,791,011 B2
(45) Date of Patent: Oct. 17, 2017

(54) BRAKE DEVICE OF TRANSMISSION

(71) Applicant: HYUNDAI MOTOR COMPANY, Seoul (KR)

(72) Inventor: Shin Jong Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/185,908

(22) Filed: Jun. 17, 2016

(65) Prior Publication Data

US 2017/0159737 A1 Jun. 8, 2017

(30) Foreign Application Priority Data

Dec. 7, 2015 (KR) .......................... 10-2015-0173438

(51) Int. Cl.
*B60W 10/10* (2012.01)
*F16D 67/06* (2006.01)
*F16H 63/30* (2006.01)

(52) U.S. Cl.
CPC ............. *F16D 67/06* (2013.01); *F16H 63/30* (2013.01)

(58) Field of Classification Search
CPC .................................. F16D 67/06; F16H 63/30
See application file for complete search history.

(56) References Cited

U.S. PATENT DOCUMENTS

| | | | | |
|---|---|---|---|---|
| 4,010,831 A * | 3/1977 | Reuter | .................. | B21D 53/16 188/218 XL |
| 5,460,579 A * | 10/1995 | Kappel | .................... | F16H 3/66 475/276 |
| 7,335,127 B2 * | 2/2008 | Tiesler | .................... | F16H 3/66 475/276 |
| 2002/0115523 A1 * | 8/2002 | Ohkubo | ................ | F16H 37/022 475/286 |
| 2005/0245344 A1 | 11/2005 | Kayama et al. | | |

FOREIGN PATENT DOCUMENTS

| | | | |
|---|---|---|---|
| JP | H07-224859 | A | 8/1995 |
| JP | H08-54059 | A | 2/1996 |
| JP | 09-14292 | A | 1/1997 |
| KR | 10-1998-027253 | A | 7/1998 |
| KR | 10-2004-0015398 | A | 2/2004 |
| KR | 10-0704498 | B1 | 4/2007 |
| KR | 10-2007-0058053 | A | 6/2007 |
| KR | 10-0889102 | B1 | 3/2009 |
| KR | 10-2009-0054135 | A | 5/2009 |
| KR | 10-2009-0062921 | A | 6/2009 |

OTHER PUBLICATIONS

Korean Office Action dated Feb. 27, 2017, issued in Korean Patent Application No. 10-2015-0173438.
Office Action issued in corresponding Korean Patent Application No. 10-2015-0173438, dated Jul. 12, 2017 with English Translation.

* cited by examiner

*Primary Examiner* — David J Hlavka
(74) *Attorney, Agent, or Firm* — McDermott Will & Emery LLP

(57) ABSTRACT

A brake device of a transmission includes a first brake provided in a transmission including an outer cone and an inner cone, a second brake provided at one end of the first brake and operated at the time of a low stage or backward movement, and an elastic body provided between the first brake and the second brake to operate the first brake or the second brake depending on a spring load.

10 Claims, 4 Drawing Sheets

BRAKE DEVICE OF TRANSMISSION

CROSS-REFERENCE TO RELATED APPLICATION

This application claims the benefit of priority to Korean Patent Application No. 10-2015-0173438, filed on Dec. 7, 2015 with the Korean Intellectual Property Office, the disclosure of which is incorporated herein in its entirety by reference.

TECHNICAL FIELD

The present disclosure relates to a brake device of a transmission, and more particularly, to a brake device of a transmission capable of allowing a brake provided in an automatic transmission to substitute for a one-way clutch function and reducing the number of plates of the brake.

BACKGROUND

Generally, an automatic transmission for a vehicle is configured to detect a driving state of the vehicle from a detecting means disposed at an appropriate location of the vehicle and automatically control an operation of a gear train consisting of a combination of planetary gear sets in a transmission control unit (TCU) on the basis of the driving state to automatically perform gear-shifting.

Therefore, it is preferable that the gear train used in the automatic transmission is configured to implement more shifting stages in order to improve power performance and a fuel consumption rate.

In addition, since durability, power transfer efficiency, size and weight, among other traits, of the gear train are significantly changed depending on a combination method of the planetary gear sets even though the same number of shifting stages are implemented, an effort to develop a gear train that is firmer, minimizes power loss and is smaller has been continuously conducted.

Further, in designing the gear train of the automatic transmission as described above, a one-way clutch acting as a planetary gear reaction force element in a 1-stage and a low and reverse (LR) brake acting as a planetary gear reaction force element in the 1-stage and an R-stage may be provided.

However, since an automatic transmission according to the related art may include both of the brake and the one-way clutch, functions of the one-way clutch and the LR brake overlap with each other in the 1-stage, and drag loss is generated from a 2-stage to a high stage.

SUMMARY

The present disclosure has been made to solve the above-mentioned problems occurring in the prior art while advantages achieved by the prior art are maintained intact.

An aspect of the present disclosure provides a brake device of a transmission capable of allowing a brake provided in an automatic transmission to substitute for a one-way clutch function and reducing the number of plates of the brake.

According to an exemplary embodiment of the present disclosure, a brake device of a transmission includes: a first brake provided in a transmission including an outer cone and an inner cone; a second brake provided at one end of the first brake and operated at the time of a low stage or backward movement; and an elastic body provided between the first brake and the second brake to operate the first brake or the second brake depending on a spring load.

The outer cone may include: an outer diameter spline coupled to an inner spline of a case of the transmission at a first end of the outer diameter spline; and an inner diameter cone provided in an inclined shape at the other end of the outer diameter spline.

The inner cone may include: an inner diameter spline coupled to a spline of a hub provided in the transmission at a first end of the inner diameter spline; and an outer diameter cone provided in an inclined shape at another end of the inner diameter spline and corresponding to the inner diameter cone of the outer cone.

The brake device of a transmission may further include a compressor plate coupled to the inner spline of the case of the transmission and having one end provided in the second brake and another end selectively adhered to the outer diameter cone of the inner cone.

The other end of the compressor plate may be provided with a first friction member corresponding to the outer diameter cone of the inner cone.

The inner diameter cone or the outer diameter cone may be provided with a second friction member.

One end of the elastic body may contact the outer cone, and the other end of the elastic body may contact the compressor plate.

According to another exemplary embodiment of the present disclosure, a brake device of a transmission includes: a first brake provided in a case of a transmission including an outer cone including an outer diameter spline and an inner diameter cone and an inner cone including an inner diameter spline and an outer diameter cone and adhered to the outer cone; a second brake provided at one end of the first brake and operated at the time of a low stage or backward movement; a compressor plate coupled to an inner spline of the case of the transmission and having one end provided in the second brake and the other end selectively adhered to the outer diameter cone of the inner cone; and an elastic body provided between the first brake and the second brake to operate the first brake or the second brake depending on a spring load and having one end contacting the outer cone and the other end contacting the compressor plate.

The outer diameter spline of the outer cone may be coupled to the inner spline of the case of the transmission at a first end of the outer diameter spline, and the inner diameter cone may be provided in an inclined shape at the other end of the outer diameter spline.

The inner diameter spline of the inner cone may be coupled to a spline of a hub provided in the transmission at a first end of the inner diameter spline; and the outer diameter cone may be formed in an inclined shape at the other end of the inner diameter spline and correspond to the inner diameter cone of the outer cone.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Exemplary embodiments of the present disclosure will be described in detail with reference to the accompanying drawings.

A brake device of a transmission according to an exemplary embodiment of the present disclosure may be configured to include a first brake 100 provided in a transmission 1, a second brake 200 provided at one end of the first brake 100 and an elastic body 300 provided between the first brake 100 and the second brake 200, as illustrated in FIGS. 1 to 4.

Figure 1:
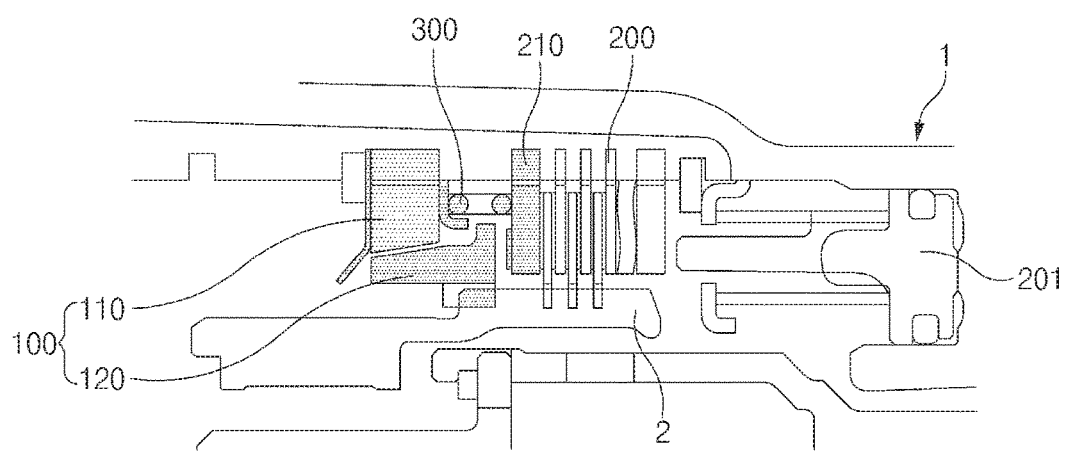
FIG. 1 is a cross-sectional view illustrating a brake device of a transmission according to an exemplary embodiment of the present disclosure.
Figure 2:
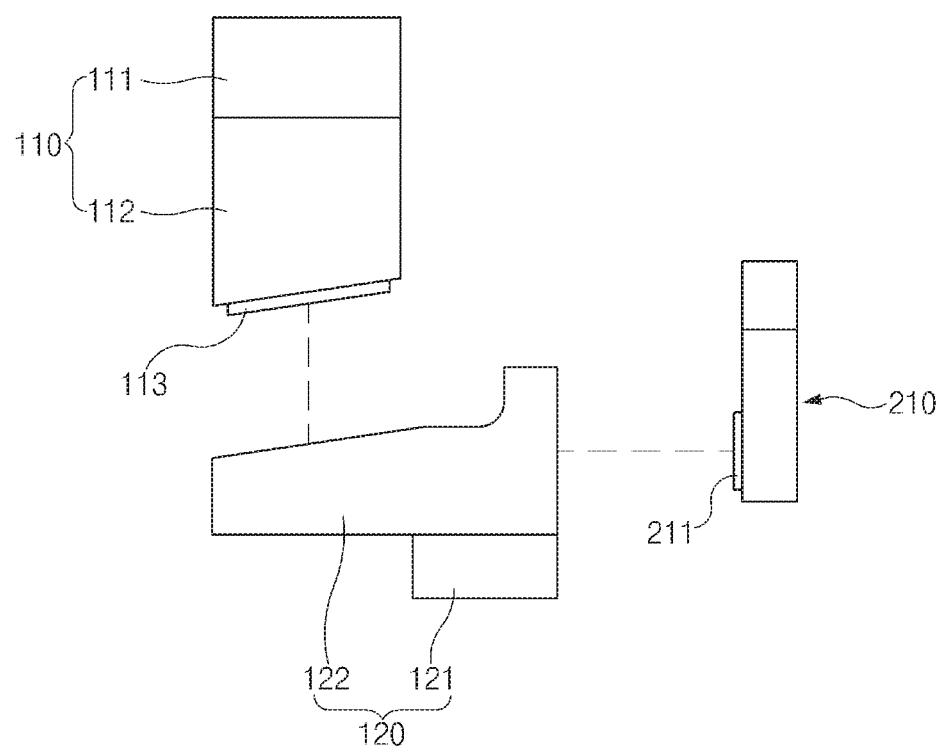
FIG. 2 is a view illustrating an outer cone, an inner cone and a compressor plate of the brake device of a transmission according to an exemplary embodiment of the present disclosure.

As illustrated in FIGS. 1 and 2, the first brake 100 may be a cone brake provided in the transmission 1 and may include an outer cone 110 and an inner cone 120 contacting each other.

Here, the outer cone 110 may include an outer diameter spline 111 coupled to an inner spline of a case of the transmission 1 and an inner diameter cone 112 provided in an inclined shape at the other end of the outer diameter spline 111.

In addition, the inner cone 120 may include an inner diameter spline 121 coupled to a spline of a hub 2 provided in the transmission 1 and an outer diameter cone 122 provided in an inclined shape at the other end of the inner diameter spline 121 and corresponding to the inner diameter cone 112 of the outer cone 110.

The second brake 200 may be a low and reverse (LR) brake provided at one end of the first brake 100 and operated at the time of a low stage or backward movement.

Figure 3:
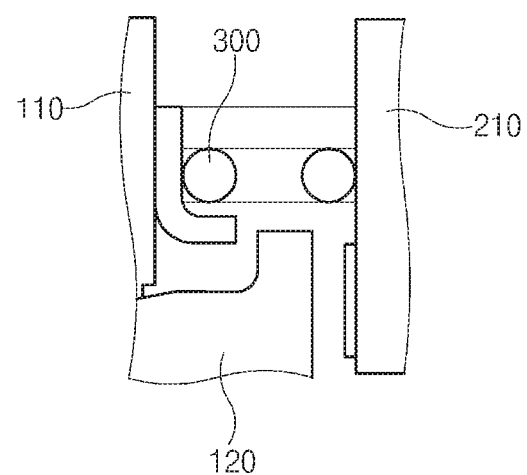
FIG. 3 is a view illustrating an elastic body of the brake device of a transmission according to an exemplary embodiment of the present disclosure.

As illustrated in FIGS. 1 and 3, the elastic body 300 may be provided between the first brake 100 and the second brake 200 to operate the first brake 100 or the second brake 200 depending on a spring load.

That is, in an exemplary embodiment of the present disclosure, a one-way clutch provided in a general automatic transmission is removed, the second brake 200 may substitute for a one-way clutch function, and the number of plates of the second brake 200 is reduced from five in the related art to three to four to reduce cost and a weight and to reduce a torque of the second brake 200 per unit oil pressure, thereby making it possible to secure controllability.

Figure 4:
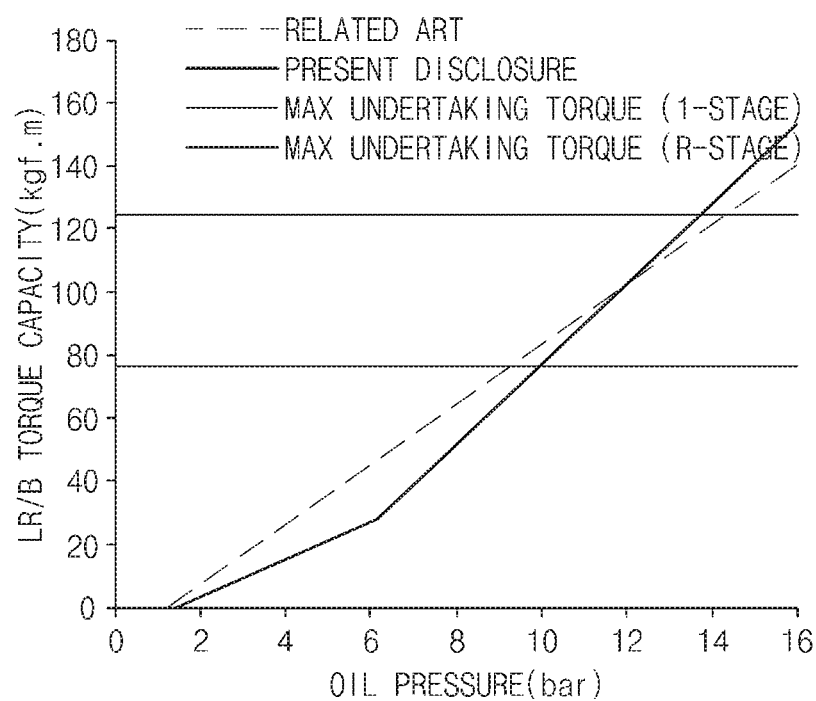
FIG. 4 is a graph illustrating a torque capacity versus oil pressure of the brake device of a transmission according to an exemplary embodiment of the present disclosure.

FIG. 4 is a graph for comparing a torque capacity test versus oil pressure of the brake device of a transmission according to an exemplary embodiment of the present disclosure with that of the related art. It may be appreciated that torque sensitivity of the second brake 200 is lowered in a low pressure part in which an oil pressure control of the second brake 200 is performed, thereby making it possible to secure controllability.

Here, since the first brake 100 may transfer a torque larger than that of a multi-plate brake at the same oil pressure by a wedge effect due to a cone angle, a reduction in a torque capacity may be complemented by a small number of plates of the second brake 200.

In addition, the elastic body 300 provided between the first brake 100 and the second brake 200 may allow the second brake 200 to be operated until before an oil pressure load of the second brake 200 arrives at a load of the elastic body 300 and may allow the second brake 200 and the first brake 100 to be operated together with each other in the case in which the oil pressure load of the second brake 200 exceeds the load of the elastic body 300.

Meanwhile, it is preferable that the brake device of a transmission according to an exemplary embodiment of the present disclosure further includes a compressor plate 210 coupled to the inner spline of the case of the transmission 1 and having one end provided in the second brake 200 and the other end selectively adhered to the outer diameter cone 122 of the inner cone 120, as illustrated in FIGS. 1 and 2.

Here, the other end of the compressor plate 210 may be provided with a first friction member 211 corresponding to the outer diameter cone 122 of the inner cone 120. The first friction member 211 of the compressor plate 210 may be adhered to a surface contacting the inner cone 120 in order to secure additional frictional force and avoid contact between the compressor plate 210 and the inner cone 120 that are relatively rotated.

In addition, the inner diameter cone 112 may be provided with a second friction member 113, and in the case in which it is difficult for the inner diameter cone 112 to be provided with the second friction member 113, the outer diameter cone 122 may be provided with the second friction member 113.

Meanwhile, one end of the elastic body 300 may contact the outer cone 110 and, the other end thereof may contact the compressor plate 210 to operate the first brake 100 in a condition in which a load of a piston 201 operating the second brake 200 is equal to or larger than the load of the elastic body 300 and constantly maintain an interval between the inner cone 120 and the compressor plate 210 at the time of turn-off of the first brake 100, thereby reducing a drag.

As described above, the brake device of a transmission according to an exemplary embodiment of the present disclosure may be configured to include the first brake 100 provided in the case of the transmission 1 and include the outer cone 110 including the outer diameter spline 111 and the inner diameter cone 1 and the inner cone 120 including the inner diameter spline 121 and the outer diameter cone 122 and adhered to the outer cone 110, the second brake 200 provided at one end of the first brake 100 and operated at the time of the low stage or the backward movement, the compressor plate 210 coupled to the inner spline of the case of the transmission 1 and having one end provided in the second brake 200 and the other end selectively adhered to the outer diameter cone 122 of the inner cone 120, and the elastic body 300 provided between the first brake 100 and the second brake 200 to operate the first brake 100 or the second brake 200 depending on the spring load and having one end contacting the outer cone 110 and the other end contacting the compressor plate 210. As described above, according to the exemplary embodiment of the present disclosure, the first brake 100, the second brake 200, and the elastic body 300 may be used instead of the one-way clutch in the automatic transmission, thereby making it possible to achieve the one-way clutch function. The number of plates of the LR brake may also be reduced, thereby making it possible to reduce cost and weight, and a torque of the second brake LR per unit oil pressure may be reduced to improve control capability, thereby making it possible to improve fuel efficiency and marketability.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A brake device of a transmission, comprising:
   a first brake provided in a transmission including an outer cone and an inner cone;
   a second brake provided at one end of the first brake and operated at the time of a low stage or backward movement; and
   an elastic body provided between the first brake and the second brake to operate the first brake or the second brake depending on a spring load.

2. The brake device of a transmission according to claim 1, wherein the outer cone includes:
   an outer diameter spline coupled to an inner spline of a case of the transmission at a first end of the outer diameter spline; and
   an inner diameter cone provided in an inclined shape at a second end of the outer diameter spline.

3. The brake device of a transmission according to claim 2, wherein the inner cone includes:
   an inner diameter spline coupled to a spline of a hub provided in the transmission at a first end of the inner diameter spline; and
   an outer diameter cone provided in an inclined shape at a second end of the inner diameter spline and corresponding to the inner diameter cone of the outer cone.

4. The brake device of a transmission according to claim 3, further comprising a compressor plate coupled to the inner spline of the case of the transmission and having one end provided in the second brake and another end selectively adhered to the outer diameter cone of the inner cone.

5. The brake device of a transmission according to claim 4, wherein the other end of the compressor plate is provided with a first friction member corresponding to the outer diameter cone of the inner cone.

6. The brake device of a transmission according to claim 3, wherein the inner diameter cone or the outer diameter cone is provided with a second friction member.

7. The brake device of a transmission according to claim 5, wherein one end of the elastic body contacts the outer cone, and the other end of the elastic body contacts the compressor plate.

8. A brake device of a transmission, comprising:
   a first brake provided in a case of a transmission including an outer cone including an outer diameter spline and an inner diameter cone and an inner cone including an inner diameter spline and an outer diameter cone and adhered to the outer cone;
   a second brake provided at one end of the first brake and operated at a time of a low stage or backward movement;
   a compressor plate coupled to an inner spline of the case of the transmission and having one end provided in the second brake and another end selectively adhered to the outer diameter cone of the inner cone; and
   an elastic body provided between the first brake and the second brake to operate the first brake or the second brake depending on a spring load and having one end contacting the outer cone and another end contacting the compressor plate.

9. The brake device of a transmission according to claim 8, wherein the outer diameter spline of the outer cone is coupled to the inner spline of the case of the transmission at a first end of the outer diameter spline, and the inner diameter cone is provided in an inclined shape at another end of the outer diameter spline.

10. The brake device of a transmission according to claim 9, wherein the inner diameter spline of the inner cone is coupled to a spline of a hub provided in the transmission at a first end of the inner diameter spline; and
   the outer diameter cone is formed in an inclined shape at another end of the inner diameter spline and corresponds to the inner diameter cone of the outer cone.

* * * * *